(12) United States Patent
Liu (10) Patent No.: US 9,893,978 B2
(45) Date of Patent: Feb. 13, 2018

(54) METHOD AND APPARATUS FOR OPERATING A ROUTING DEVICE AND RELEVANT ROUTING DEVICE

(71) Applicant: Telefonaktiebolaget L M Ericsson (publ), Stockholm (SE)

(72) Inventor: Yanxing Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/907,629

(22) PCT Filed: Aug. 5, 2013

(86) PCT No.: PCT/CN2013/080842
§ 371 (c)(1),
(2) Date: Jan. 26, 2016

(87) PCT Pub. No.: WO2015/017967
PCT Pub. Date: Feb. 12, 2015

(65) Prior Publication Data
US 2016/0164770 A1    Jun. 9, 2016

(51) Int. Cl.
*H04L 12/24* (2006.01)
*H04L 12/757* (2013.01)
*H04L 12/721* (2013.01)

(52) U.S. Cl.
CPC ............ *H04L 45/023* (2013.01); *H04L 45/12* (2013.01); *H04L 41/12* (2013.01)

(58) Field of Classification Search
CPC ........ H04L 45/023; H04L 45/12; H04L 41/12
See application file for complete search history.

(56) References Cited

U.S. PATENT DOCUMENTS

| 6,963,927 | B1 * | 11/2005 | Lee | H04L 45/00 370/238 |
| 7,266,085 | B2 * | 9/2007 | Stine | H04L 12/5695 370/252 |

(Continued)

FOREIGN PATENT DOCUMENTS

CN    101442474 A    5/2009

OTHER PUBLICATIONS

Extended European Search Report for Application No. EP 13 89 0962—dated Feb. 10, 2017.

(Continued)

*Primary Examiner* — Parth Patel
*Assistant Examiner* — Kai Chang
(74) *Attorney, Agent, or Firm* — Baker Botts LLP (57) ABSTRACT

One of the embodiments of the present invention relates to a method for operating a routing device in a network. The method comprises: receiving, during routing table calculation for a first topology change associated with a first routing device, a message indicative of a second topology change associated with a second routing device; determining a time duration of a hold time period based on a running time required for performing shortest path first calculations for a shortest path between the routing device and the second routing device, wherein the running time is retrieved from a running time database and the running time database is configured to store plural values each of which is indicative of a running time required for performing shortest path first calculations for a shortest path between the routing device and each of other routing devices in the network, wherein during the hold time period, the routing device does not perform any further routing table calculation. The present invention also relates to corresponding routing device.

15 Claims, 5 Drawing Sheets

(56) References Cited

U.S. PATENT DOCUMENTS

| | | | | |
|---|---|---|---|---|
| 2002/0150039 | A1* | 10/2002 | Valdevit | H04L 45/02 370/216 |
| 2004/0246914 | A1* | 12/2004 | Hoang | H04L 45/02 370/254 |
| 2005/0195835 | A1* | 9/2005 | Savage | H04L 12/2602 370/401 |
| 2006/0291391 | A1* | 12/2006 | Vasseur | H04L 12/5695 370/235 |
| 2007/0263544 | A1* | 11/2007 | Yamanaka | H04L 45/12 370/238 |
| 2008/0013465 | A1* | 1/2008 | Yasukawa | H04L 12/1877 370/256 |
| 2008/0062862 | A1* | 3/2008 | Goyal | H04L 45/00 370/218 |
| 2008/0159127 | A1* | 7/2008 | Ozaki | H04L 45/00 370/225 |
| 2009/0285101 | A1* | 11/2009 | Lu | H04L 41/12 370/238 |
| 2011/0158085 | A1* | 6/2011 | Aloush | H04L 45/028 370/225 |
| 2011/0258341 | A1* | 10/2011 | Suzuki | H04L 45/02 709/241 |
| 2011/0267979 | A1* | 11/2011 | Suzuki | H04L 45/48 370/254 |
| 2012/0127875 | A1* | 5/2012 | Zhao | H04L 12/4625 370/252 |
| 2012/0320903 | A1 | 12/2012 | Ilagan | |
| 2013/0083802 | A1* | 4/2013 | Chen | H04L 45/28 370/401 |
| 2013/0308444 | A1* | 11/2013 | Sem-Jacobsen | H04L 47/125 370/230 |
| 2014/0173133 | A1* | 6/2014 | Ammireddy | H04L 45/02 709/241 |

OTHER PUBLICATIONS

PCT Notification of Transmittal of the International Search Report and the Written Opinion of the International Searching Authority, or the Declaration for International application No. PCT/CN2013/080842, dated May 6, 2014.

PCT Notification Concerning Transmittal of International Preliminary Report on Patentabiity (Chapter I of the Patent Cooperation Treaty) dated Feb. 18, 2016.

* cited by examiner

METHOD AND APPARATUS FOR OPERATING A ROUTING DEVICE AND RELEVANT ROUTING DEVICE

PRIORITY

This nonprovisional application is a U.S. National Stage Filing under 35 U.S.C. §371 of International Patent Application Serial No. PCT/CN2013/080842, filed Aug. 5, 2013, and entitled "Method and Apparatus for Operating a Routing Device and Relevant Routing Device."

TECHNICAL FIELD

The embodiments of the present invention generally relate to a communication network, particularly to a method and apparatus for operating a routing device in a network.

DESCRIPTION OF THE RELATED ART

Link state routing protocols, e.g. open shortest path first (OSPF) and Intermediate System to Intermediate System (IS-IS) Routing Protocol, using shortest path first (SPF) routing, are the most commonly used Interior Gateway Protocols (IGP) today. The time required to adjust to a change in the network topology (speed of convergence) is key performance of IGP. When there is a change in the topology of the network, these protocols take from several to tens of seconds to converge to the new topology. During this transient, the network service may suffer serious deterioration in quality or may breakdown completely. Hence, significant attention has been given to achieve fast convergence to topology changes in OSPF and IS-IS. Often, there is a tradeoff involved between reducing the convergence delay and increasing the processing/bandwidth overhead of the routing protocol.

At present, the Link state routing protocols requires a router to perform a routing table calculation on receiving a new Link Status Advertisement (LSA). A topology change causes a number of new LSAs to be generated. To avoid multiple routing table calculations following a topology change, some routing devices enforce a certain hold time between two consecutive routing table calculations.

Normally the convergence to a topology change consists of the following steps:

detecting a topology change by the routing devices in the vicinity followed by adjacency establishments/breakdowns and the generation of new Link State Advertisements (LSAs);

flooding the new LSAs throughout the network;

performing routing table calculations by each routing device on receiving the LSAs, followed by distribution of the routing table updates.

As discussed above, with a typical topology change, such as a router up event, a router down event, link down event, etc., may cause generation of several new LSAs. These LSAs may not arrive simultaneously on a given routing device. If a routing device were to perform a routing table calculation immediately on receiving a new LSA, it may end up doing several such calculations in quick succession that may keep the CPU of the routing device busy for several hundred milliseconds even minutes and prevent it from doing other important tasks such as timely generation and processing of Hello messages. Such scenarios are undesirable as they may lead to network-wide routing instability. Hence, a routing device typically does not perform a routing table calculation immediately on receiving a new LSA.

In the prior art, a fixed value parameter SPF hold time can be used, to limit the frequency of routing table updates to once per seconds level. Additionally, there was an initial delay in doing a routing table calculation after receiving the first new LSA since the previous routing table calculation is accomplished. While initial SPF delay and SPF hold time limit the number of routing table calculations and hence help avoid routing instability, however, they also slow down the router's convergence.

There exists two prior art solutions. In one solution, fixed initial time and hold time are used by most packet related products. With this solution the default values for example, 2 seconds for initial SPF delay and 5 seconds for SPF hold time can be applied to each routing devices. A routing device therefore may take anywhere between 2 to 7 seconds to converge to a topology change after receiving a new LSA. In another solution, to balance the needs for fast convergence and routing stability, exponential hold time was raised to adjust the hold time between successive routing table calculations. In this solution, the hold time between successive routing table calculations is initially set to a small value and increases exponentially with the frequency of received new LSAs.

The main problem with existing hold time solutions is difficulty in configuring the parameters of hold time in order to achieve good performance such as quick convergence with one or two routing table calculations for all possible topology change scenarios in a network. For a given setting of the hold time parameter, some topology changes may require too many routing table calculations or cause too much convergence delay.

Therefore, it is desired to provide a novel solution for operating a routing device to determine and configure an appropriate SPF hold time period.

SUMMARY OF THE INVENTION

To solve at least one of the problems in the prior art, one or more method and apparatus embodiments according to the present invention aim to provide a solution for operating a routing device in a network.

According to an aspect of the present invention, an embodiment of the present invention provides a method for operating a routing device in a network. The method comprises receiving, during routing table calculation for a first topology change associated with a first routing device, a message indicative of a second topology change associated with a second routing device; determining a time duration of a hold time period based on a running time required for performing shortest path first calculations for a shortest path between the routing device and the second routing device. The running time is retrieved from a running time database and the running time database is configured to store plural values each of which is indicative of a running time required for performing shortest path first calculations for a shortest path between the routing device and each of other routing devices in the network. During the hold time period, the routing device is configured not to perform any further routing table calculation in response to receipt of a subsequent message indicative of a further topology change.

According to an aspect of the present invention, an embodiment of the present invention provides a routing device for operating in a network. The routing device comprises: a routing table calculation unit configured to perform routing table calculation; a running time database storing plural values, each of the plural values being indicative of a running time required for performing shortest path first calculations for a shortest path between the routing device and each of other routing devices in the network; a receiving unit configured to receive, during the routing table calculation unit performing routing table calculation for a first topology change associated with a first routing device, a message indicative of a second topology change associated with a second routing device; a hold time determining unit configured to determine a time duration of a hold time period based on a running time required for performing shortest path first calculations for a shortest path between the routing device and the second routing device. The running time is retrieved from the running time database. During the hold time period, the routing table calculation unit is configured to not perform any further routing table calculation in response to receipt of a subsequent message indicative of a further topology change.

According to an aspect of the present invention, an embodiment of the present invention provides an apparatus for operating a routing device in a network. The apparatus comprises: receiving unit for receiving, during routing table calculation for a first topology change associated with a first routing device, a message indicative of a second topology change associated with a second routing device; determining unit for determining a time duration of a hold time period based on a running time required for performing shortest path first calculations for a shortest path between the routing device and the second routing device. The running time is retrieved from a running time database and the running time database is configured to store plural values each of which is indicative of a running time required for performing shortest path first calculations for a shortest path between the routing device and each of other routing devices in the network. During the hold time period, the routing device is configure to not perform any further routing table calculation in response to receipt of a subsequent message indicative of a further topology change.

According to one or more embodiments of the present invention, when receiving a message such as a LSA during routing table calculation, the routing device determines the hold time based on the running time required for performing shortest path first calculations for a shortest path between the routing device and the LSA-associated routing device, which is more accurate than those prior art solutions. It helps the routing device to achieve better performance on convergence in case of topology changes in the network.

BRIEF DESCRIPTION OF THE DRAWINGS

Inventive features regarded as the characteristics of the present invention are set forth in the appended claims. However, the present invention, its implementation mode, other objectives, features and advantages will be better understood through reading the following detailed description on the exemplary embodiments with reference to the accompanying drawings, where in the drawings:

DETAILED DESCRIPTION OF THE PREFERRED EMBODIMENT

Hereinafter, embodiments of the present invention will be described with reference to the accompanying drawings. In the following description, many specific details are illustrated so as to understand the present invention more comprehensively. However, it is apparent to the skilled in the art that implementation of the present invention may not have these details. Additionally, it should be understood that the present invention is not limited to the particular embodiments as introduced here. On the contrary, any arbitrary combination of the following features and elements may be considered to implement and practice the present invention, regardless of whether they involve different embodiments. Thus, the following aspects, features, embodiments and advantages are only for illustrative purposes, and should not be understood as elements or limitations of the appended claims, unless otherwise explicitly specified in the claims.

Figure 1:
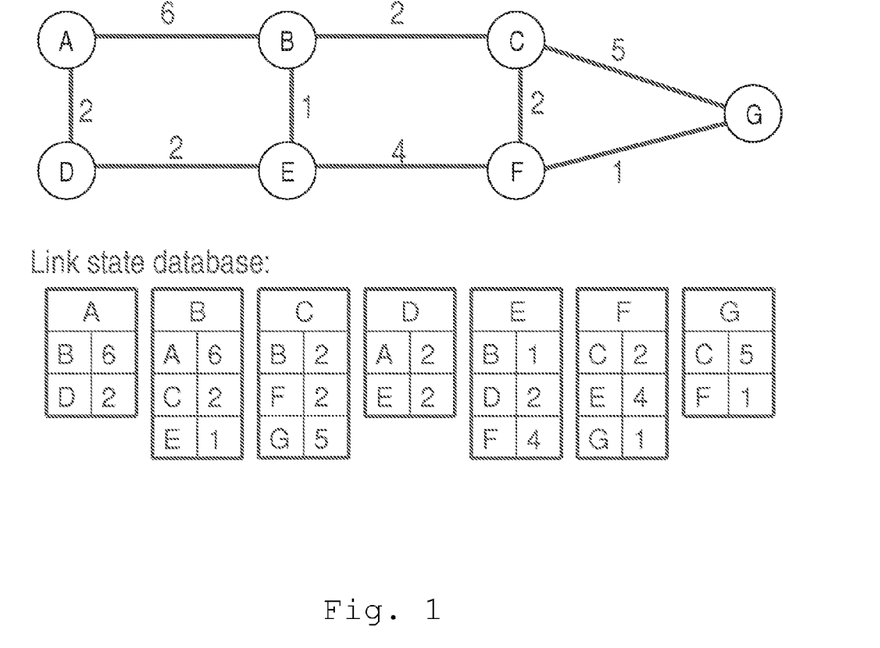
FIG. 1 schematically illustrates a diagram of an exemplary topology of a network in which one or more embodiments of the present invention may be implemented.

FIG. 1 schematically illustrates a diagram of an exemplary topology graph of a network 100 in which one or more embodiments of the present invention may be implemented.

As shown in FIG. 1, the network 100 comprises plural routing devices, which are denoted as nodes A-G of the graph. An edge between two nodes indicates there is a link between the routing devices corresponding to those nodes and a link state weight is associated with each link to identify the link condition.

Each of the routing devices A-G maintains a link state database, which comprises list of all the latest LSPs (Link State Paths) from each routing device in the network 100. By way of example, the link state database is also shown in FIG. 1. For instance, the routing device B is directly connected with the routing devices A, C, E according to the latest topology of the network 100; the link state database then comprise a record relating to the routing device B to identify the adjacent routing devices A, C, E and the corresponding link state weights 6, 2, 1 on the links between them.

When a topology change occurs in the network 100, each of the routing devices A-G needs to update its link state database and perform routing table calculation by using the updated link state database as an input.

SPF algorithm is adopted to perform routing table calculation. In theory, SPF algorithm complexity could be bounded as $O(L+N*\log(N))$ where N is number of the nodes in the network and L is the number of the links in a topology under consideration. Even the modern hardware allowed significantly reducing the impact of SPF runtime on the network convergence than before, but it is still one of the major contributors to the convergence time. The use of Incremental SPF (iSPF) allows to further minimize the amount of calculations needed when partial changes occur in the network. For example, a LSA (OSFP Type-1) flooding for a leaf connection of the network does not cause complete SPF re-calculation anymore like it would have been when using classic SPF. An important benefit is that the farther away the router is from the topology change, the less time it needs to re-compute the SPF. This compensates for the longer propagation delay to deliver the LSA from a distant corner of the network.

The inventors of the present invention have noted that the total time it took OSPF process to run SPF, how these values vary, depends on where the failure is. The maximum value can be found and used as an upper limit for SPF computation in your network.

With references to FIGS. 2 to 6, various embodiments of the present invention will be set forth in detail.

Figure 2:
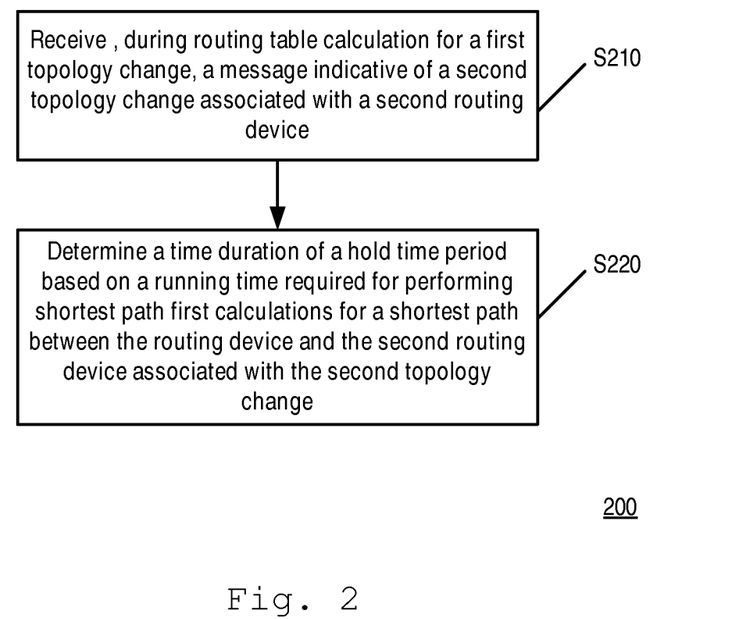
FIG. 2 schematically illustrates an exemplary flow chart of a method for operating a routing device in a network according to one or more embodiments of the present invention.

FIG. 2 schematically illustrates an exemplary flow chart of a method (200) for operating a routing device in a network according to one or more embodiments of the present invention.

As shown in FIG. 2, in step S210, during routing table calculation for a first topology change associated with a first routing device, a message indicative of a second topology change associated with a second routing device is received. Here, the first topology change for which the routing table calculation is performed is different from the second topology change being indicated by the newly received message.

In practice, a topology change may be caused by node down events, node up events, link change/failure events, and so on. Each of such events involves at least one node (i.e., a routing device), which may be used to approximately identify the location where the topology change occurs. In this regard, it may be referred as to "a topology change associated with a particular routing device".

In step S220, a time duration of a hold time period is determined based on a running time required for performing SPF calculations for a shortest path between the routing device and the second routing device associated with the second topology change.

The running time mainly depends on failure location and hardware platform (mainly CPU performance). There are various algorithms that may be used to perform the SPF calculation, such as Dijkstra algorithm. The SPF calculation runs at each routing device, computing each possible path to the destination, adding up each cost. The running time can be retrieved from a running time database, which is configured to store plural values each of which is indicative of a running time required for performing SPF calculations for a shortest path between the routing device and each of other routing devices in the network. It should be noted that "shortest path" in this disclosure indicates a path with the shortest link cost. It is not necessarily the shortest distance and may be expressed by other parameters.

During the determined hold time period, the routing device is configured not to perform any further routing table calculation in response to receipt of a subsequent message indicative of a further topology change.

According to one or more embodiments of the present invention, the running time database may be configured to store a running time period required for performing SPF calculation between the root-node routing device and each of the leave-node routing devices of a shortest-path tree. The shortest-path tree is formed by using the routing device performing SPF calculation as the root.

According to one or more alternative embodiments of the present invention, in the running time database, the running time database may be configured to store the value associated with a running time period required for performing SPF calculation between two routing devices of the shortest-path tree.

Figure 3:
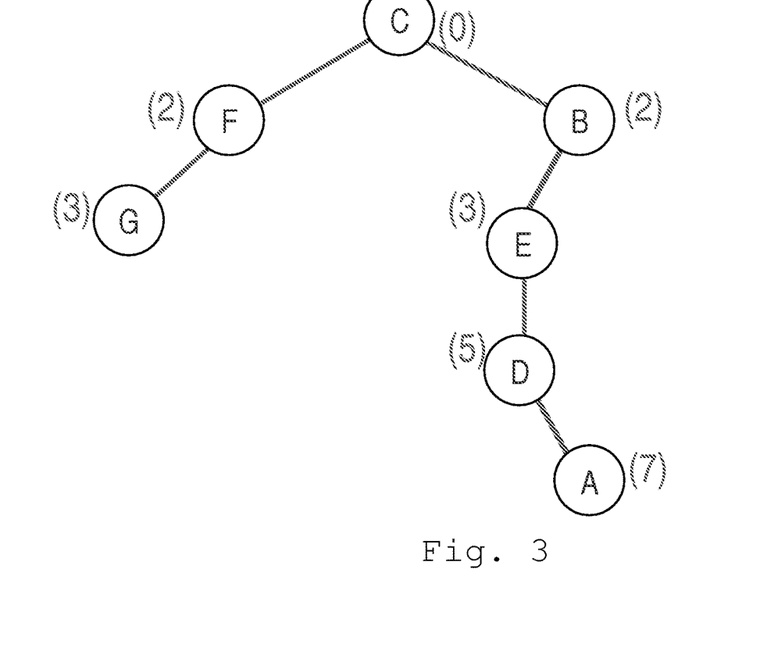
FIG. 3 schematically illustrates a shortest-path tree of the network 100.

Consider the example where the routing device C operates according to the method 200 of FIG. 2. FIG. 3 schematically illustrates a shortest-path tree 300 of the network 100 with the routing device C as the root node. The paths between the root node C and the leave nodes A, B, D, E, F, G of the shortest-path tree 300 indicate the shortest paths from the routing device C to the routing devices A, B, D, E, F, G and the corresponding link state weights for the respective shortest paths are denoted in the parenthesis, respectively.

When performing routing table calculation for the first topology change for example associated with the routing device G, the routing device C receives a message indicative of the topology change associated node A. In this example, the topology change may be a link failure between the routing devices A and B, which causes node A to be relocated in the shortest-path tree so as to be connected with node B via the link with weight 6. As an consequence, the link state weight for the shortest path from the routing device C to the routing device A is changed to 8 accordingly.

In response the receipt of the message, the routing device C determines a time duration of a hold time period based on the running time, so as to configuring the hold time period in which the routing device C will not do such calculations besides that being performing currently.

The time duration of a hold time period is determined based on a running time required for performing SPF calculations for a shortest path between the routing device C and the routing device A.

In this example, the running time may be retrieved from the running time database of the routing device C and corresponds to the time required for performing SPF calculations for a shortest path between the routing device C and the routing device A.

Figure 4:
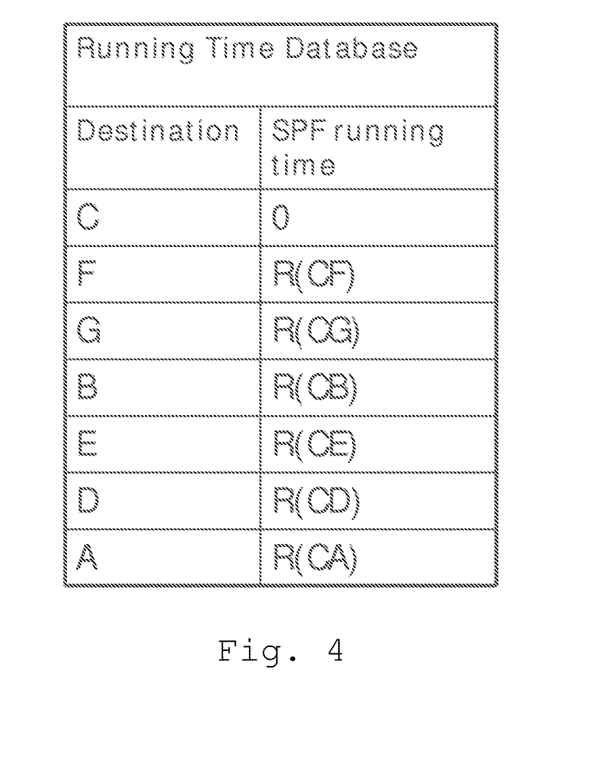
FIG. 4 schematically illustrates a running time database of a routing device.

FIG. 4 schematically illustrates an example structure of a running time database 400 of the routing device C.

As shown in the example, the running time database 400 stores SPF running time between the root-node routing device C and each of the leave-node routing devices of a shortest-path tree 300. In this example, by querying the running database 400, the running time required for performing SPF calculations for a shortest path between the routing device C and the routing device A can be retrieved as R(CA).

During performing routing table calculations, the running time database 400 may be updated according to the time consumption of SPF calculation for the shortest path between the root node to a respective leave node. The running time database 400 may be established by using for example an algorithm as below:

```
start = systemtime( )        //* Initialize the start time to system time *//
dist[r] = 0                  //* Set distance to root node zero *//
ts[r] = 0                    //* Set SPF running time for root node zero *//
for all v ∈ V{r}
    do dist[v] = ∞           //* Set all other distances to infinity *//
S = 0                        //* S denotes the set of visited nodes, which is initially empty *//
Q = V                        //* Q, the queue initially contains all nodes *//
```

-continued

```
while Q ≠0                    //* While the queue is not empty *//
do u = min(Q,dist)            //* Select the element of Q with the min. distance *//
  S {u} = u                   //* Add u to listof visited nodes *//
    for all v ∈ neighbors[u]
      do if dist[v] > dist[u] + w(u, v)     //* If new shortest path found *//
        then dist[v] = dist[u] + w(u, v)    //* Set new value of shortest path *//
          ts[v] = consumption(start)        //* Obtain SPF running time for node
v *//
return dist, ts
```

According to an alterative embodiment of the present invention, the running time database 400 may store values of the SPF running time periods required for performing SPF calculation between two routing devices of a shortest-path tree 300, i.e., R(CF), R(CB), R(FG), R(BE), R(ED), R(DA). This can be achieved for example by reconfiguring the start time stamp of the function consumption( ) of the above pseudo code so as to record the SPF running time required for deriving a next hop in the shortest path from the root-node routing device C. In this example, by querying the running database 400, the running time required for performing SPF calculations for a shortest path between the routing device C and the routing device A can be retrieved as R(CB)+R(BE)+R(ED)+R(DA).

Referring back to FIG. 2 again, according to one or more embodiments of the present invention, in the determining step S220, the time duration of the hold time period may be determined to be the SPF running time retrieved from the running time database depending on the topology change location.

According to one or more alternative embodiments of the present invention, in the determining step S220, the time duration of the hold time period may determined to be a sum of the SPF running time retrieved from the running time database depending on the topology change location, and a time period required for updating RIB (Route Information Base) and FIB (Forward Information Base) in the routing device, for example, the routing device C. For the update time of RIB and FIB, it is routing device hardware independent and can be easy to measure the time consumption of one time configuration. By this way, difference in hardware processing capabilities between one routing device and another may be advantageously taken into account in determining the hold time period.

Figure 5:
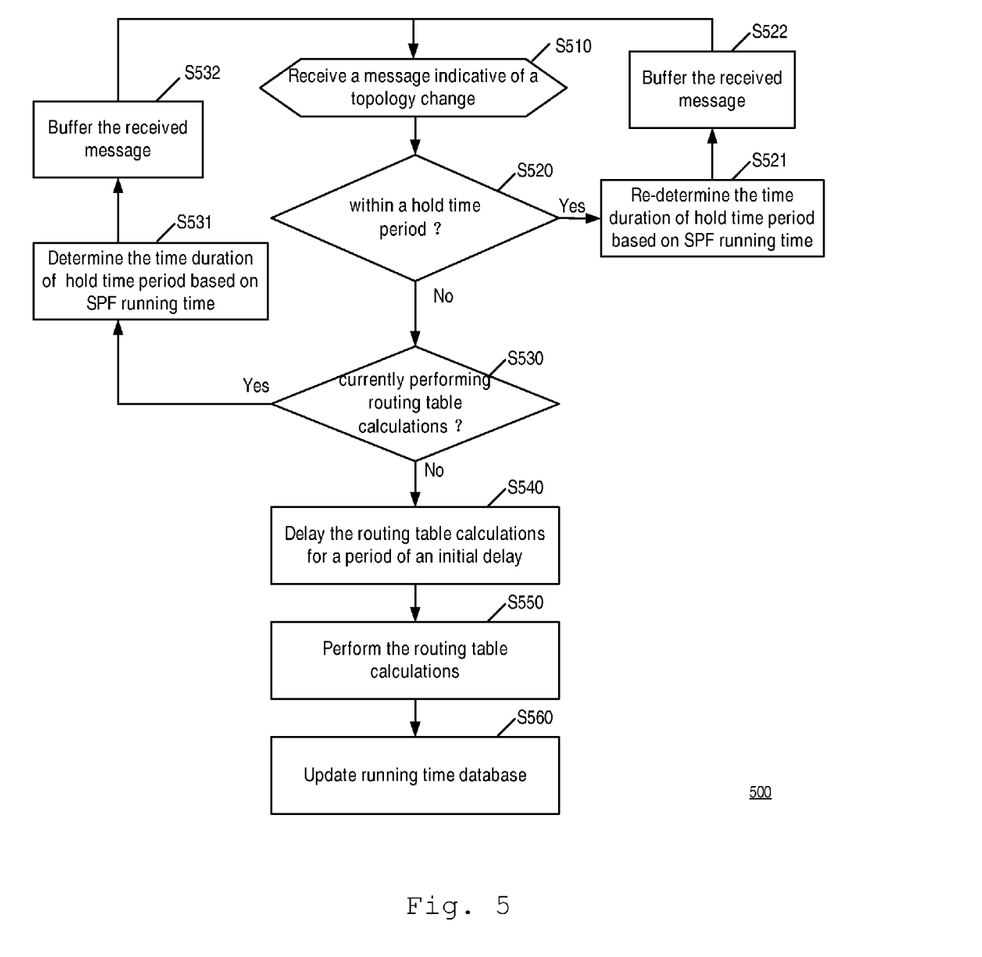
FIG. 5 schematically illustrates an exemplary flow chart of a processing for determining SPF running time for routing devices according to one or more embodiments of the present invention.

FIG. 5 schematically illustrates an exemplary process flow 500 of the routing device C, according to one or more embodiments of the present invention.

As shown in FIG. 5, in step S510, the routing device C has detected that a message indicative of a topology change, for example a LSA, is received.

In step S520, it is determined whether the routing device C is configured to be within a hold time period. If the determination result is "Yes", i.e., the routing device is now within a hold time period, then the process 500 will proceed with steps S521 to S522; if the determination result is "No", i.e., the routing device C is not applied a hold time now, then the process 500 will continue to perform step S530.

Under the condition that the routing device C is now within a hold time period, the topology change message received in S510 may trigger re-determination of the time duration of the hold time period according to one or more embodiments of the present invention. In step S521, the time duration of the hold time period can be re-determined based on a new running time required for performing SPF calculations for the shortest path between the routing device C and the routing device that is associated with the topology change indicated by the message received in step S510. The new running time can also be retrieved from the running time database 400. In an implementation, the time duration of the hold time period may be re-determined by extending the time duration for the new SPF running time, so that the routing device C keeps not to perform any further routing table calculation in response to receipt of a subsequent message indicative of a further topology change. Although not triggering an immediate routing table calculation, the message received in step S510 is queued in a buffer of the routing device C in step S522 so as to be processed after the hold time period. The process 500 then may return to step S510 to monitor whether there is a new topology change message received. Although not shown in FIG. 5 for the purpose of conciseness, according to an implementation, after the hold time period, the routing device C may perform routing table calculations for all topology changes indicated by the messages buffered during the hold time period.

Under the condition that the routing device C is currently not within a hold time period, the process 500 goes into step S530.

In step S530, it is determined whether the routing device C is currently performing routing table calculations. If the determination result is "Yes", i.e., the routing device C is now performing routing table calculations, then the process 500 will proceed with steps S531 to S532; if the determination result is "No", i.e., the routing device C is in a stable state after a convergence, then the process 500 will go to step S540.

Under the condition that the routing device C is now performing routing table calculations, the received message in step S510 triggers determination and configuration of a hold time period to the routing device C. In step S531, the time duration of the hold time period can be determined in accordance with any of embodiments described with reference to FIGS. 2-4, so that the routing device C is configured not to perform any further routing table calculation in response to receipt of a subsequent message indicative of a further topology change. Although not triggering an immediate routing table calculation, the message received in step S510 is queued in a buffer of the routing device C in step S532 so as to be processed after the hold time period. The process 500 then may return to step S510 to monitor whether there is a new topology change message received. Although not shown in FIG. 5 for the purpose of conciseness, according to an implementation, after the hold time period, the routing device C may perform routing table calculations for all topology changes indicated by the messages buffered during the hold time period.

Under the condition that the routing device C is currently not performing routing table calculation, that is, it is in a stable state after a previous convergence, in step S540, the routing device C may delay the routing table calculation for a period of an initial delay, in response to the receipt of the message received in step S510. The target of initial SPF delay is have long enough delay in order not to trigger the SPF before the LSA is flooded out. It's hard to determine the delay to flood the LSA, but at least the initial SPF delay should stay above the per-interface LSA flood pacing timer, so that it does not delay two consecutive LSAs flooded through the topology (as normal, a typical transit link failure results in generation of at least two LSAs). Therefore, in one or more advantageous embodiments of the present invention, the initial SPF delay may be configured to be a value greater than a value of an interface flooding pacing timer, for example, 2 times of the interface flooding pacing timer.

In step S550, the routing device C performs the routing table calculations for the topology change indicated in the message received in step S510. In the case that there is still any un-processed topology change message buffered in the routing device C, then the all of those topology changes may be processed together to update the routing table of the routing device C to adapt the latest network topology in this step.

In step S560, along with the routing table calculations, at least one of the plural values of the running time database 400 associated with paths influenced by the topology change(s) can be updated based on the routing table calculations.

Figure 6:
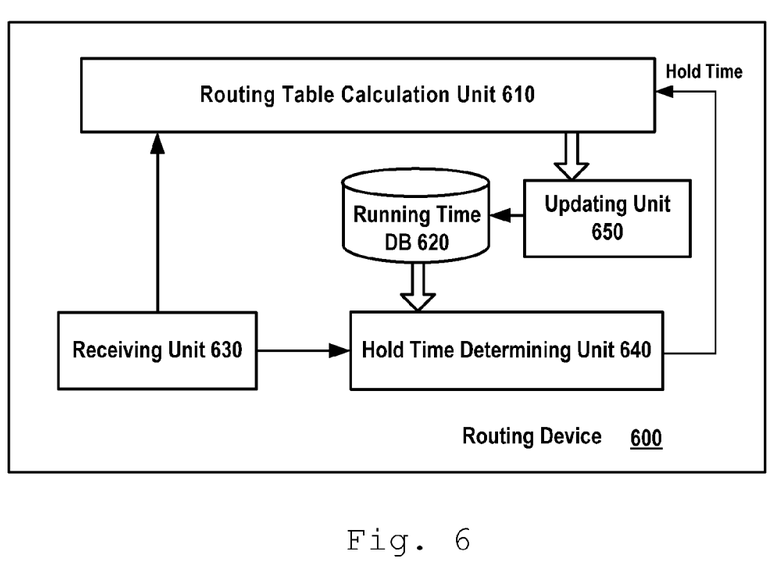
FIG. 6 schematically illustrates a block diagram of a routing device according to one or more embodiments of the present invention.

Although the embodiments of the method for operating a routing device according to the present invention have been described in detail with reference to FIGS. 2 and 5, those skilled in the art may appreciate that the flow charts of FIGS. 2 and 5 are shown only by way of example, but not intend to limit the scope of the invention. Those skilled in the art may modify the above-described process flows to adapt to practical requirements of network and routing device configurations. For example, in the stage of system initialization, for a routing device, the initial delay and the time period required for updating RIB and FIB may be set as default values and the running time database may be established by performing SPF calculations. As another optional solution, the routing device according to embodiments of the present invention may also support customer configuration of the SPF hold time period and the initial delay, which may have relatively high priority. One implementation of an embodiment of the present invention is provided by pseudo code as below:

FIG. 6 schematically illustrates a block diagram of a routing device 600 according to one or more embodiments of the present invention.

As shown in FIG. 6, the routing device 600 for operating in a network comprises a routing table calculation unit 610, a running time database 620, a receiving unit 630, and a hold time determining unit 640.

The routing table calculation unit 610 is configured to perform routing table calculation(s) according to topology change(s) indicated by LSA messages.

The running time database 620 stores plural values, each of the plural values is indicative of a running time required for performing SPF calculations for a shortest path between the routing device 600 and each of other routing devices in the network. In one or more embodiments of the present invention, each of the values stored in the running time database 620 may be associated with a running time period required for performing SPF calculation between the routing device 600 and each of other routing devices of the shortest-path tree using the routing device 600 as the root. In one or more alternative embodiments of the present invention, each of the values stored in the running time database 620 may be associated with a running time period required for performing SPF calculation between two nodes (i.e., routing devices) of the shortest-path tree using the routing device as the root.

The receiving unit 630 is configured to receive messages such as LSAs indicative of topology changes associated with a routing device. In a scenario, during the routing table calculation unit 610 is currently performing routing table calculation for a first topology change associated with a first routing device, the message indicative of a second topology change associated with a second routing device, which is received by the receiving unit 630 triggers the hold time determination of the hold time determining unit 640.

The hold time determining unit 640 is configured to determine a time duration of the hold time period based on a running time required for performing SPF calculations for a shortest path between the routing device 600 and the second routing device. The hold time determining unit 640 retrieves the running time from the running time database 620. According to one or more embodiments of the present invention, the hold time determining unit 640 may be configured to determine the time duration of the hold time

```
//* System Initialization * //
Initial_Delay = DEFAULT                          //* Setup the Initial_Delay to DEFUALT which
can be self-defined or based on standard *//
RIB_FIB_Update = Get_Rib_Fib_Update( )           //* Initialize the RIB_FIB_Update time *//
Ts[v]                                            //*Build running time database *//
//* Hold Time Calculation * //
If Get_Input (Initial_Delay, SPF_Delay) = TRUE   //* Customer input can be higher priority *//
then Set_Initial_Delay(Initial_Delay)
   Set_SPF_Delay(SPF_Delay)
else
   Set_Default_Initial_Delay( )
   Set_Default_SPF_Delay( )
//* Network Convergence * //
If First_Time_TC( )         //* Judge if it is the first time topology change after last time
convergence *//
then Insert_Into_TC_List(Node_ID)
   Get_Default_Initial_Delay( )
   Do_SPF_Delay(delay)
else if Search_TC_List(Node_ID) = FALSE          //* For duplicated topology change only count
one time *//
then Get_Running_Time(Node_ID)
   Update_Hold_Time(time)
   Do_SPF_Delay(delay)
end
``` period to be a sum of the running time retrieved from the running time database 620 by using the second routing device as the key value, and a time period required for updating route information base (not shown in FIG. 6) and forward information base (not shown in FIG. 6) in the routing device 600.

When the determined hold time period is applied to the routing device 600, the routing table calculation unit 610 is configured not to perform any further routing table calculation in response to receipt of a subsequent message indicative of a further topology change.

According to one or more embodiments of the present invention, the routing device 600 may further comprise an updating unit 650. The updating unit 650 may be configured to update at least one of the plural values of the running time database 620, which is associated with paths influenced by the first topology change based on the routing table calculation performed by the routing table calculation unit 610.

According to one or more embodiments of the present invention, the receiving unit 630 may receive a message indicative of a third topology change associated with a third routing device in the network, while the routing device 600 is in a stable state after a convergence, i.e., the routing device 600 performs no routing table calculation and is not in the hold time period. In response to the receipt of this message, the routing table calculation unit 610 may be configured to perform, after waiting for a period of delay, routing table calculation for the third topology change. According to one or more embodiments of the present invention, the delay may be configured to be a value greater than a value of an interface flooding pacing timer.

According to one or more embodiments of the present invention, the receiving unit 630 may receive a message indicative of a fourth topology change associated with a fourth routing device in the network while the routing device 600 is in the hold time period. In response of the receipt of this message, the hold time determining unit 640 may be further configured to re-determine the time duration of the hold time period based on a running time required for performing SPF calculations for a shortest path between the routing device 600 and the fourth routing device. The running time may also be retrieved from the running time database 620.

Here, the routing device 600 as illustrated in FIG. 6 is described with the modules or components which are most relevant to the embodiments of the present invention. However, those skilled in the art can appreciate that the routing device 600 also comprises conventional functional modules and components for performing the functionality of network communication, including processors such as one or more of general purpose computers, special purpose computers, microprocessors, digital signal processors (DSPs) and processors based on multi-core processor architecture; memory module of any type suitable to the local technical environment and implemented using any suitable data storage technology; etc. Those modules or components are well known in the art and the description thereof is omitted for the purpose of conciseness.

According to one or more embodiments of the present invention, when receiving a message such as a LSA during routing table calculation, the routing device determines the hold time based on the running time required for performing SPF calculations for a shortest path between the routing device and the LSA-associated routing device, which more accurately configures the hold time than those prior art solutions. It helps the routing device to achieve better performance on convergence incase of topology changes in the network.

In general, the various exemplary embodiments may be implemented in hardware or special purpose circuits, software, logical or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block and signaling diagrams, it is well understood that these blocks, apparatus, systems, techniques or methods described herein may be implemented in, as non-limiting examples, hardware, software, firmware, special purpose circuits or logical, general purpose hardware or controller or other computing devices, or some combination thereof.

As such, it should be appreciated that at least some aspects of the exemplary embodiments of the inventions may be practiced in various components such as integrated circuit chips and modules. As well known in the art, the design of integrated circuits is by and large a highly automated process.

The present invention may also be embodied in the computer program product which comprises all features capable of implementing the method as depicted herein and may implement the method when loaded to the computer system.

According to one or more embodiments of the present invention, an apparatus for operating a routing device in a network comprises: receiving unit for receiving (S210, S510), during routing table calculation for a first topology change associated with a first routing device, a message indicative of a second topology change associated with a second routing device; determining unit for determining (S220, S531) a time duration of a hold time period based on a running time required for performing shortest path first calculations for a shortest path between the routing device and the second routing device, wherein the running time is retrieved from a running time database and the running time database is configured to store plural values each of which is indicative of a running time required for performing shortest path first calculations for a shortest path between the routing device and each of other routing devices in the network; wherein during the hold time period, the routing device is configure to not perform any further routing table calculation in response to receipt of a subsequent message indicative of a further topology change.

The present invention has been specifically illustrated and explained with reference to the preferred embodiments. The skilled in the art should understand various changes thereto in form and details may be made without departing from the spirit and scope of the present invention.

What is claimed is:

1. A method for operating a routing device in a network, comprising:
    receiving, during routing table calculation for a first topology change associated with a first routing device, a message indicative of a second topology change associated with a second routing device;
    determining a time duration of a hold time period based on a running time required for performing shortest path first calculations for a shortest path between said routing device and said second routing device, wherein said running time is retrieved from a running time database and said running time database is configured to store plural values each of which is indicative of a running time required for performing shortest path first calculations for a shortest path between said routing device and each of other routing devices in said network, wherein during said hold time period, said routing device does not perform any further routing table calculation.

2. The method according to claim 1, further comprising:
updating at least one of said plural values of said running time database associated with paths influenced by said first topology change based on said routing table calculation.

3. The method according to claim 1, further comprising:
receiving a message indicative of a third topology change associated with a third routing device in said network, while said routing device performs no routing table calculation and is not in the hold time period;

after waiting for a period of delay, performing routing table calculation in response to said message indicative of said third topology change.

4. The method according to claim 3, wherein
said delay is configured to be a value greater than a value of an interface flooding pacing timer.

5. The method according to claim 1, wherein said value indicative of said running time required for performing shortest path first calculations for said shortest path between said routing device and each of other routing devices in said network is associated with a running time period required for performing shortest path first calculation between two routing devices of a shortest-path tree using said routing device as the root.

6. The method according to claim 1, wherein determining said hold time period comprises determining said time duration of said hold time period to be a sum of said running time required for performing shortest path first calculations for the shortest path between said routing device and said second routing device, and a time period required for updating route information base and forward information base in said routing device.

7. The method according to claim 1, further comprising:
receiving a message indicative of a fourth topology change associated with a fourth routing device in said network while said routing device is in the hold time period; and re-determining said time duration of said hold time period based on a running time required for performing shortest path first calculations for a shortest path between said routing device and said fourth routing device, wherein said running time is retrieved from said running time database.

8. A routing device for operating in a network, comprising:
a routing table calculation unit configured to perform routing table calculation;

a running time database storing plural values, each of said plural values being indicative of a running time required for performing shortest path first calculations for a shortest path between said routing device and each of other routing devices in said network;

a receiving unit configured to receive, during said routing table calculation unit performing routing table calculation for a first topology change associated with a first routing device, a message indicative of a second topology change associated with a second routing device;

a hold time determining unit configured to determine a time duration of a hold time period based on a running time required for performing shortest path first calculations for a shortest path between said routing device and said second routing device, wherein said running time is retrieved from said running time database, wherein during said hold time period, said routing table calculation unit is configured to not perform any further routing table calculation.

9. The routing device according to claim 8, further comprising:
an updating unit configured to update at least one of said plural values of said running time database associated with paths influenced by said first topology change based on said routing table calculation performed by said routing table calculation unit.

10. The routing device according to claim 8, wherein said receiving unit is further configured to receive a message indicative of a third topology change associated with a third routing device in said network, while said routing device performs no routing table calculation and is not in the hold time period; and said routing table calculation unit is configured to perform, after waiting for a period of delay, routing table calculation in response to said message indicative of said third topology change.

11. The routing device according to any of claims 10, wherein
said delay is configured to be a value greater than a value of an interface flooding pacing timer.

12. The routing device according to claim 8, wherein said value indicative of said running time required for performing shortest path first calculations for said shortest path between said routing device and each of other routing devices in said network is associated with a running time period required for performing shortest path first calculation between two routing devices of a shortest-path tree using said routing device as the root.

13. The routing device according to claim 8, wherein said hold time determining unit is configured to determine said time duration of said hold time period to be a sum of said running time required for performing shortest path first calculations for the shortest path between said routing device and said second fault routing device, and a time period required for updating route information base and forward information base in said routing device.

14. The routing device according to claim 8, wherein
said receiving unit is further configured to receive a message indicative of a fourth topology change associated with a fourth routing device in said network while said routing device is in the hold time period; and
said hold time determining unit is further configured to re-determine said time duration of said hold time period based on a running time required for performing shortest path first calculations for a shortest path between said routing device and said fourth routing device, wherein said running time is retrieved from said running time database.

15. An apparatus for operating a routing device in a network, comprising:
receiving unit for receiving, during routing table calculation for a first topology change associated with a first routing device, a message indicative of a second topology change associated with a second routing device;

determining unit for determining a time duration of a hold time period based on a running time required for performing shortest path first calculations for a shortest path between said routing device and said second routing device, wherein said running time is retrieved from a running time database and said running time database is configured to store plural values each of which is indicative of a running time required for performing shortest path first calculations for a shortest path between said routing device and each of other routing devices in said network;

wherein during said hold time period, said routing device is configure to not perform any further routing table calculation in response to receipt of a subsequent message indicative of a further topology change.

\* \* \* \* \*